(12) United States Patent
Singla

(10) Patent No.: US 11,560,763 B2
(45) Date of Patent: Jan. 24, 2023

(54) METHODS AND APPARATUS FOR PRE-TORQUE DETECTION IN A THREADED CONNECTION

(71) Applicant: FORUM US, INC., Houston, TX (US)

(72) Inventor: Mithun Singla, Richmond, TX (US)

(73) Assignee: Forum US, Inc., Houston, TX (US)

( * ) Notice: Subject to any disclaimer, the term of this patent is extended or adjusted under 35 U.S.C. 154(b) by 547 days.

(21) Appl. No.: 16/668,256

(22) Filed: Oct. 30, 2019

(65) Prior Publication Data

US 2021/0131199 A1 May 6, 2021

(51) Int. Cl.
*E21B 19/16* (2006.01)
*B25B 23/14* (2006.01)
*F16L 15/00* (2006.01)

(52) U.S. Cl.
CPC ............ *E21B 19/166* (2013.01); *B25B 23/14* (2013.01); *F16L 15/00* (2013.01); *Y10T 29/49766* (2015.01)

(58) Field of Classification Search
CPC ........ B25B 23/14; F16L 15/00; E21B 19/165; E21B 19/166; Y10T 29/49766
See application file for complete search history.

(56) References Cited

U.S. PATENT DOCUMENTS

| | | | | |
|---|---|---|---|---|
| 4,210,017 A | * | 7/1980 | Motsinger | G01L 5/24 702/41 |
| 4,305,472 A | * | 12/1981 | Brossette | E21B 19/166 173/180 |
| 4,400,785 A | * | 8/1983 | Wallace | B23P 19/066 73/862.24 |
| 4,938,109 A | * | 7/1990 | Torres | E21B 19/166 173/181 |
| 4,941,362 A | * | 7/1990 | Tambini | B25B 23/145 81/470 |
| 7,100,698 B2 | * | 9/2006 | Kracik | E21B 19/166 166/380 |
| 7,191,686 B1 | * | 3/2007 | Angelle | E21B 19/168 81/57.16 |
| 7,958,787 B2 | * | 6/2011 | Hunter | E21B 19/163 73/862.21 |
| 8,590,401 B2 | | 11/2013 | Conquergood et al. | |
| 9,027,416 B2 | * | 5/2015 | Conquergood | E21B 19/166 73/862.08 |
| 9,097,070 B2 | | 8/2015 | Hunter | |
| 10,329,857 B2 | | 6/2019 | Hunter | |

(Continued)

OTHER PUBLICATIONS

International Search Report and Written Opinion dated Jan. 13, 2021, corresponding to Application No. PCT/US2020/057560.

*Primary Examiner* — Bayan Salone
(74) *Attorney, Agent, or Firm* — Patterson + Sheridan, LLP

(57) ABSTRACT

A wrench assembly comprises an upper clamp assembly adapted to grip a first tubular, a lower clamp assembly coupled to the upper clamp assembly, the lower clamp assembly adapted to grip a second tubular, wherein the upper clamp assembly includes a plurality of torqueing cylinders coupled thereto, and a torque detection circuit in fluid communication with the torqueing cylinders, wherein the torque detection circuit is configured to apply a rotational force to the upper clamp assembly for a predetermined period of time prior to applying a target torque value to complete a threaded connection.

18 Claims, 4 Drawing Sheets

(56) References Cited

U.S. PATENT DOCUMENTS

| | | |
|---|---|---|
| 2005/0077084 A1* | 4/2005 | Kracik .................. E21B 19/166 175/24 |
| 2009/0205442 A1 | 8/2009 | Hunter |
| 2012/0210827 A1 | 8/2012 | Hickman |
| 2015/0107550 A1 | 4/2015 | Remele et al. |
| 2016/0010406 A1 | 1/2016 | Henderson et al. |
| 2017/0321502 A1 | 11/2017 | Rose |
| 2018/0120183 A1* | 5/2018 | Ruehmann ............ E21B 19/165 |
| 2019/0136669 A1 | 5/2019 | Wiedecke et al. |
| 2019/0316428 A1 | 10/2019 | Meuth et al. |

\* cited by examiner

METHODS AND APPARATUS FOR PRE-TORQUE DETECTION IN A THREADED CONNECTION

BACKGROUND

Field

Embodiments disclosed herein relate to methods and apparatus for detecting torque in a threaded connection.

Description of the Related Art

In the oil and gas industry, tubulars a threadedly connected to each other to form a tubular string such as a drill or production string for use on a rig of an oil and gas well. A spinner tool is commonly used to rotate the tubular when making up a threaded connection with another tubular. The spinner tool rotates one tubular relative to another tubular to thread the tubulars together during a make-up operation. The spinner is a relatively low torque, high speed device used for the initial makeup of a threaded connection. Then a wrench tool, such as a power tong, is used to provide a greater amount of torque to complete the threaded connection.

One problem that often occurs is that the wrench tool over-torques the threaded connection due, at least in part, to pre-existing torque applied to the threaded connection by the spinner tool and/or the wrench tool. For example, if a threaded connection requires a target torque of 50,000 ft.-lbs., and if at the end of a stroke of the wrench tool, the threaded connection has about 46,000 ft.-lbs, then the wrench tool has to be reset to get to the target torque. However, if the wrench tool is operated with full power, then there is a risk of over-torqueing the threaded connection. This over-torqueing of the threaded connection can lead to numerous problems and safety issues, such as a threaded connection failure, which can shut down a rig operation entirely.

Therefore, there exists a need for methods and apparatus for torque detection in threaded connections.

SUMMARY

In one embodiment, a wrench assembly, comprises an upper clamp assembly configured to grip a first tubular; a lower clamp assembly coupled to the upper clamp assembly, the lower clamp assembly configured to grip a second tubular, wherein the upper clamp assembly includes a plurality of torqueing cylinders; and a control system having a torque detection circuit in fluid communication with the torqueing cylinders, wherein the control system is configured to apply a rotational force to the upper clamp assembly via the torque detection circuit for a predetermined period of time prior to applying a target torque value to complete a threaded connection.

In one embodiment, a method for applying torque to a threaded connection comprises gripping a first tubular with an upper clamp assembly; gripping a second tubular with a lower clamp assembly, the second tubular being at least partially coupled to the first tubular by a threaded connection; rotating the first tubular relative to the second tubular to determine a rate of change of torque on the threaded connection for a predetermined time; determining whether the rate of change of torque is greater than or less than a predetermined rate of change of torque; and rotating the first tubular relative to the second tubular until a target torque is reached.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure include methods and apparatus for detecting pre-existing torque in a threaded connection, and in response, reducing power suppled to a wrench tool applying the torque to prevent over-torqueing of the threaded connection. The threaded connection includes joining two tubulars utilized in an oil and/or gas rig operation by a wrench tool such as a power tong. However, methods and apparatus disclosed herein may be adapted for use with other threaded connections such as in a nut and bolt connection that may be further torqued with a pneumatic, electric, and/or hydraulic tool.

Figure 1A:
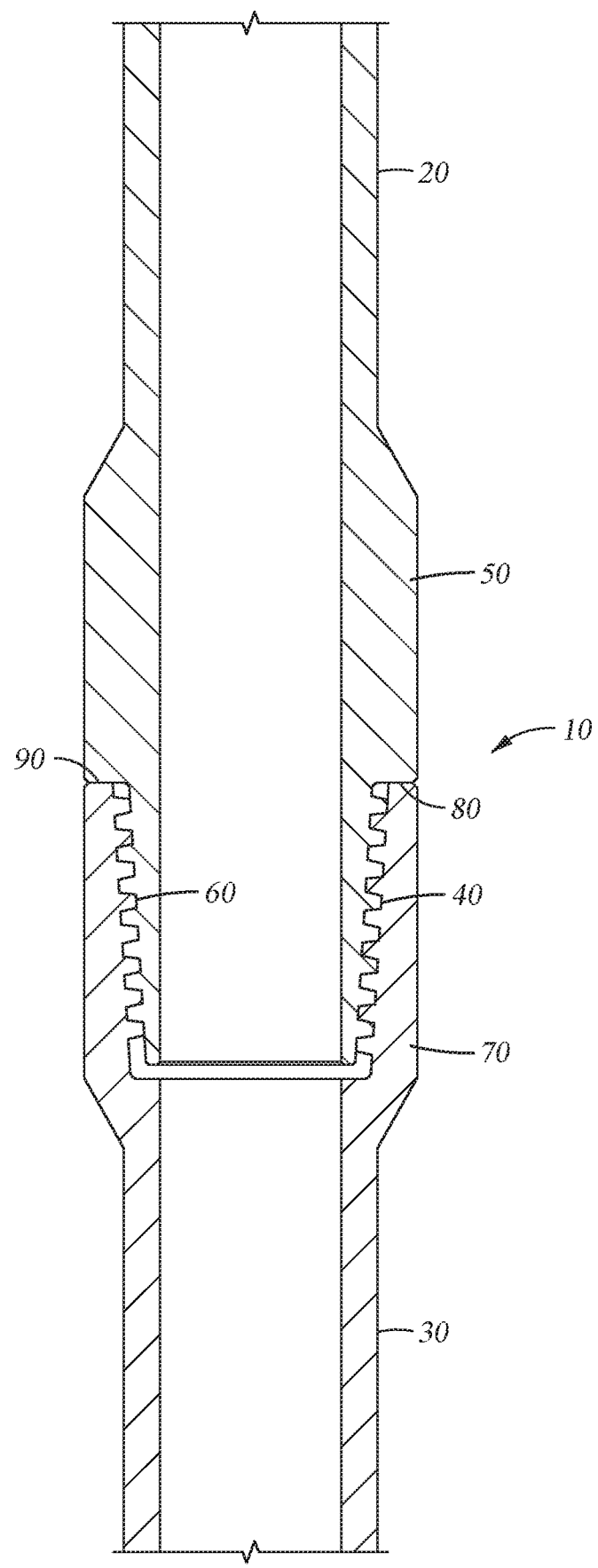
FIG. 1A is a sectional view of a threaded connection between a first tubular and a second tubular according to one embodiment.

FIG. 1A is a sectional view of a threaded connection 10 between a first tubular 20 and a second tubular 30. The threaded connection 10 includes male threads 40 on a pin end 50 of the first tubular 20, and female threads 60 on a box end 70 of the second tubular 30. The first tubular 20 and the second tubular 30 are joined together and are first made-up using a primary rotating tool, such as a spinner tool, an iron roughneck, or other similar tool known in the art. The primary rotating tool is a relatively low torque, high speed device used for the initial makeup of the threaded connection. The primary rotating tool generally applies enough torque such that shoulders 80 and 90 of the first tubular 20 and the second tubular 30, respectively, make contact. After initial joining using the primary rotating tool, the threaded connection 10 is further tightened by a wrench tool (as shown in FIG. 1B), which is a relatively high torque, low speed device that is used to provide a greater amount of torque than the primary rotating tool to complete the threaded connection 10.

Figure 1B:
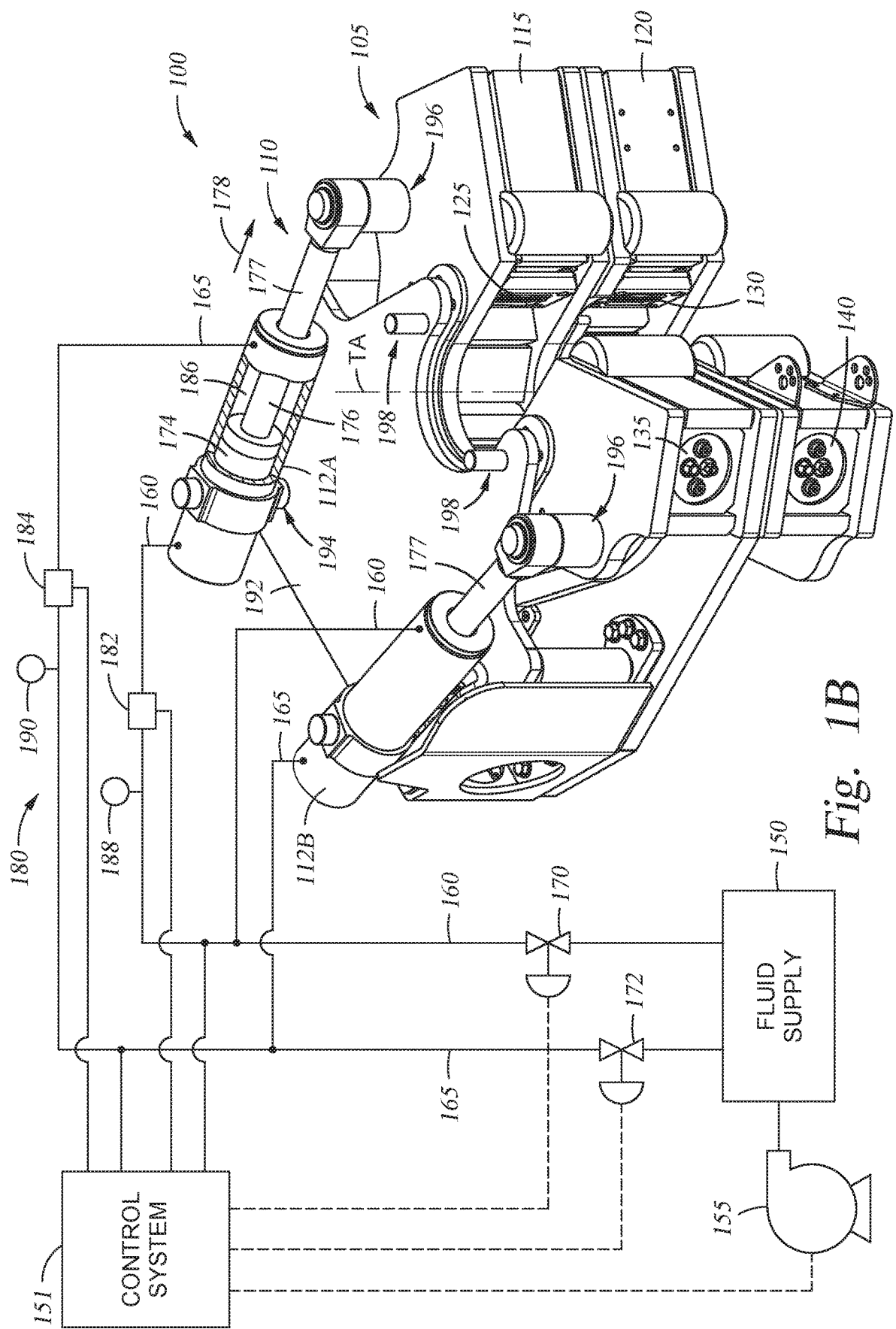
FIG. 1B is an isometric view of a wrench tool according to one embodiment.

FIG. 1B is an isometric view of a wrench tool 100 according to one embodiment. The wrench tool 100 includes a wrench assembly 105 coupled to a fluid supply 150. Although not shown, a spinner tool may be placed above the wrench assembly 105 generally in the space identified by reference numeral 110.

The wrench assembly 105 includes an upper clamp assembly 115 and a lower clamp assembly 120. The wrench assembly 105 also includes torqueing cylinders 112A and 112B that rotate the upper clamp assembly 115 relative to the lower clamp assembly 120 about a tool axis TA. The upper clamp assembly 115 and the lower clamp assembly 120 include a plurality of grip assemblies 125 and 130, respectively.

The upper grip assembly 125 includes one or more upper grip actuators 135, and the lower grip assembly 130 includes one or more lower grip actuators 140. The grip assemblies 130 of the lower clamp assembly 120 may be used to grip the box end 70 of the first tubular 20 (shown in FIG. 1A). The grip assemblies 125 of the upper clamp assembly 115 may be used to grip the pin end 50 of the second tubular 30 (shown in FIG. 1A).

In a make-up operation, the wrench tool 100 is brought into proximity with the first tubular 20, which may be held by a rotary spider on a rig floor for example. The grip assemblies 130 of the lower clamp assembly 120 are actuated by the lower grip actuators 140 to grip the box end 70 of the first tubular 20. The pin end 50 of the second tubular 30 is positioned on top of the box end 70 of the first tubular 20, which may be lowered by an elevator or top drive for example.

The second tubular 30 is rotated by a primary rotating tool to initially make up the threaded connection 10 between the first tubular 20 and the second tubular 30. After the initial make up, the grip assemblies 125 of the upper clamp assembly 115 are actuated by the upper grip actuators 135 to grip the pin end 50 of the second tubular 30, while the box end 70 of the first tubular 20 remains gripped by the lower clamp assembly 120. The upper clamp assembly 115 then is rotated by the torqueing cylinders 112A and 112B relative to the lower clamp assembly 120 to further tighten and complete the threaded connection 10 between the first tubular 20 and the second tubular 30.

During the initial make up of the threaded connection 10 with the primary rotating tool, and/or when at least partially completing the threaded connection 10 with the wrench tool 100, the threaded connection 10 may include a pre-existing amount of torque. The threaded connection 10 may be partially complete when the wrench tool 100 has applied a full stroke of torque to the threaded connection, but a target amount of torque was not achieved, thereby requiring the wrench tool 100 to be reset to apply another stroke of torque to the threaded connection. The pre-existing torque, whether caused by the primary rotating tool and/or the wrench tool, may cause over-torqueing of the threaded connection 10, which can lead to failure.

Although both torqueing cylinders 112A and 112B may be used, in one embodiment of a make-up operation using the wrench tool 100, pressurized hydraulic fluid from the fluid supply 150 is applied to the torqueing cylinder 112A using a pump 155 in order to rotate the upper clamp assembly 115 clockwise relative to the lower clamp assembly 120. The fluid is provided in fluid lines 160, 165 (which may be conduits or hoses for example) and the fluid is controlled by valves 170 and 172, respectively. The valves 170, 172 are coupled to a control system 151 that is in communication with the pump 155 and the valves 170, 172. Specifically, the valve 170 is opened to apply fluid to a first chamber 174 that acts upon a piston 176 that causes the piston 176 to extend a rod 177 in the direction of arrow 178. The rod 177 is pivotably connected to the upper clamp assembly 115 and causes the upper clamp assembly 115 to rotate relative to the lower clamp assembly 120.

The control system 151, which controls fluid flow through the valves 170, 172, further includes a torque detection circuit 180 having sensing devices 182 and 184. Each of the sensing devices 182 and 184 may be a load sensor, a pressure transducer, or other device configured to detect loads and/or pressures. The sensing devices 182 and 184 may monitor loads in one or both of the first chamber 174 and a second chamber 186 of the torqueing cylinder 112A. Pressure gauges 188 and 190 may also be utilized to sense pressures in one or both of the first chamber 174 and the second chamber 186, respectively. While not shown, the torqueing cylinder 112B includes a piston as well as a first and second chamber similar to torqueing cylinder 112A.

When both of the torqueing cylinders 112A and 112B are utilized in the make-up of the threaded connection 10, the torqueing cylinder 112B would be pressurized to rotate the upper clamp assembly 115 relative to the lower clamp assembly 120. However, the rod 177 of the torqueing cylinder 112B would move in a direction opposite to the direction of arrow 178. In the case of both torqueing cylinders 112A and 112B being used, the fluid lines 160, 165 coupled between the valve 170 and the torqueing cylinder 112B would include sensing devices and gauges that are in communication with the control system 151. In a break-out operation to loosen the threaded connection 10, pressurized fluid is supplied to the opposite chambers of one or both of the torqueing cylinders 112A and 112B to rotate the upper clamp assembly 115 relative to the lower clamp assembly 120 in a direction opposite to the direction of arrow 178 (e.g., counterclockwise).

Each of the torqueing cylinders 112A and 112B are coupled to a base 192 at first pivot points 194. An opposing end of the torqueing cylinders 112A and 112B is coupled to the upper clamp assembly 115 at second pivot points 196. The base 192 is pivotably coupled to the upper clamp assembly 115 by pins 198. When one or both of the torqueing cylinders 112A and 112B are supplied with pressurized fluid, the upper clamp assembly 115 rotates relative to the lower clamp assembly 120.

The control system 151 controls fluid flow through the valves 170, 172, which controls the flow rate of fluid flow to one or both of the torqueing cylinders 112A and 112B. If high torque is needed, a greater flow of pressurized fluid is provided to one or both of the torqueing cylinders 112A and 112B, such as by fully opening one or both of the valves 170, 172. However, when only slight torque is needed, the control system 151 controls the valves 170, 172 to only apply a desired amount of pressurized fluid to flow to one or both of the torqueing cylinders 112A and 112B, such as by at least partially closing one or both of the valves 170, 172.

Initially, in order to detect pre-existing torque in the threaded connection 10 after the primary rotating tool joins the tubulars, the control system 151 causes the pressurized fluid to rotate the upper clamp assembly 115 clockwise relative to the lower clamp assembly 120 for a period of time (e.g., during a predetermined time (PT)) at a relatively slow rotational speed. Then the control system 151 closes the valve 172, and the rate of change (e.g., rotation of the first tubular relative to the second tubular over time) is sensed by the torque detection circuit 180.

While the torque detection circuit 180 detects torque, if any, in the threaded connection 10, any pre-existing torque is not quantified but merely is detected to alert an operator that a pre-existing torque exists. This alert can be beneficially utilized by the operator to operate the wrench tool 100 at a speed lower than normal operating speed in order to finish torqueing the threaded connection 10. If no preexisting torque exists in the threaded connection 10, the wrench tool 100 can be operated at normal operating speed to finish torqueing the threaded connection 10. The torque detection circuit 180 communicates any torque detection to the control system 151.

Figure 2A:
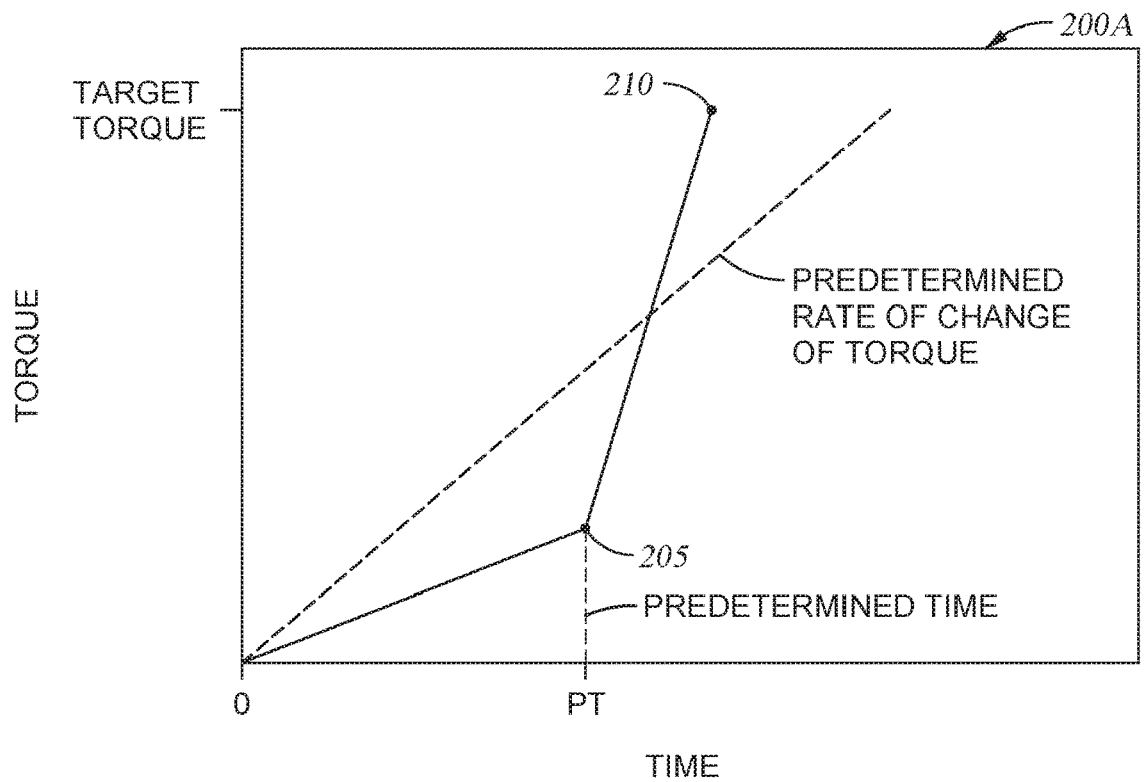
FIGS. 2A and 2B are graphs showing two modes of operation of a torque detection circuit of the wrench tool shown in FIG. 1B according to one embodiment.
Figure 2B:
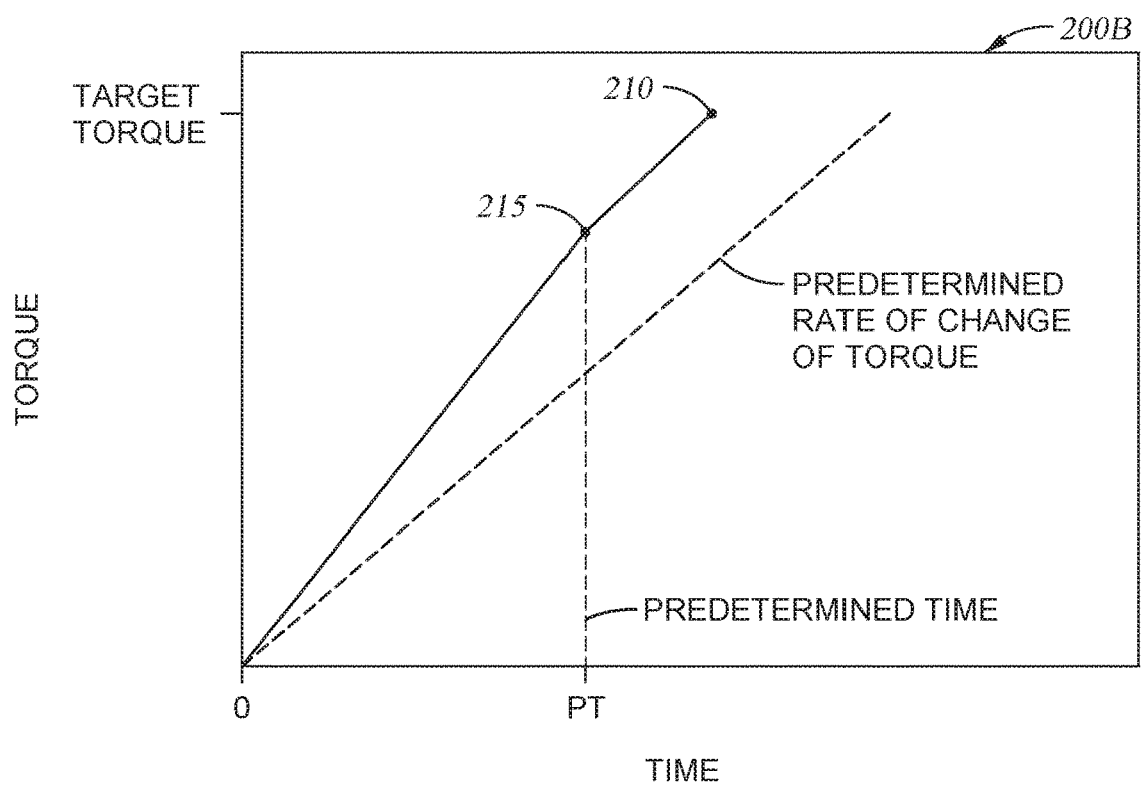

FIGS. 2A and 2B are graphs 200A and 200B showing two modes of operation of the control system 151. Both of graph 200A and 200B show a curve indicating predetermined rate of change in torque (in dashed lines), and the control system 151 applying torque to the wrench tool 100 during a predetermined time.

In graph 200A, the predetermined time ends at point 205. The rate of change of torque at point 205 is below (less than) the predetermined rate of change in torque curve. This indicates that no pre-existing torque is detected, which alerts an operator to continue to apply any additional torque by the wrench tool 100 at normal operational speed until at least the target torque is reached at point 210. Rotation of the upper clamp assembly 115 relative to the lower clamp assembly 120 is controlled by fluid flow from one or more of the valves 170, 172 flowing pressurized fluid to the respective torqueing cylinders 112A and 112B. For example, instructions from the control system 151 to one or both of the valves 170, 172 provide full flow of pressurized fluid (e.g., at or near 100%) to one of both of the torqueing cylinders 112A and 112B until the target torque is reached.

In graph 200B, the predetermined time ends at point 215 (which is the same amount of predetermined time in graph 200A). The rate of change of torque is above (greater than) the predetermined rate of change in torque curve. This indicates that a pre-existing torque is detected by the torque detection circuit 180 and communicated to the control system 151, which alerts the operator to continue to apply any additional torque by the wrench tool 100 at a slower speed (e.g. a speed lower/less than the normal operating speed) until at least the target torque is reached at point 210. Applying additional torque at a slower speed includes the control system 151 adjusting one or both of the valves 170, 172 to limit flow of pressurized fluid to one of both of the torqueing cylinders 112A and 112B. For example, the control system 151 may control one or both of the valves 170, 172 to limit flow of the pressurized fluid to about 75% of full flow in one embodiment. In other embodiments, the limit of flow may be about 50%, or less. The limiting of flow of pressurized fluid thus slows the rotation of the upper clamp assembly 115 relative to the lower clamp assembly 120. Slowing the rotation provides more control of torqueing such that the target torque is not exceeded.

Figure 3:
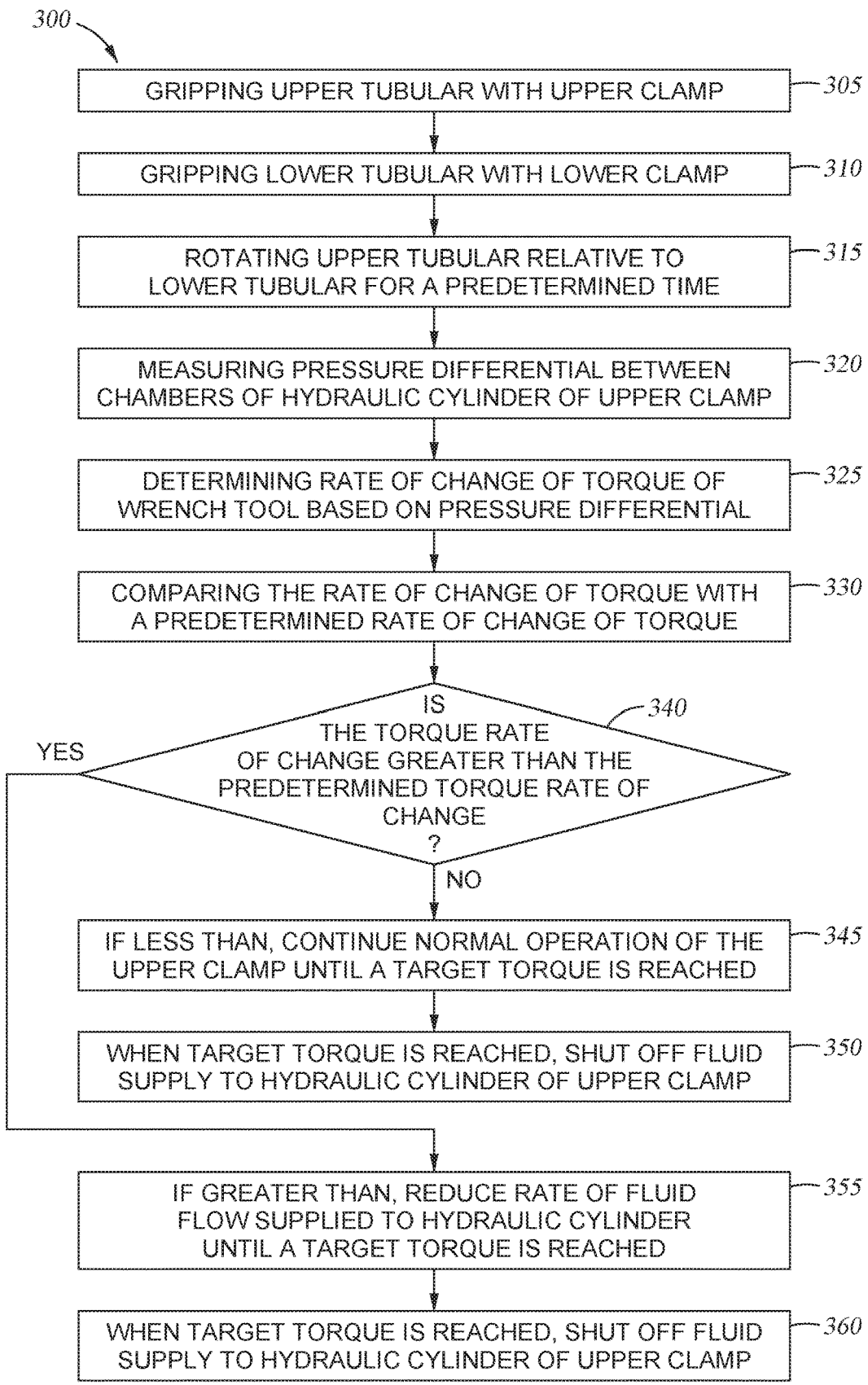
FIG. 3 is a flowchart representing a method of detecting pre-existing torque in a threaded connection using the torque detection circuit according to one embodiment.

FIG. 3 is a flowchart representing a method 300 of detecting pre-existing torque in a threaded connection 10 using the control system 151 as described herein. The flowchart references elements shown and described in FIGS. 1A-1B above. The method 300 begins after the threaded connection 10 is initially made-up using a primary rotating tool.

Step 305 includes gripping an upper tubular (the first tubular 20) with the upper clamp assembly 115 of the wrench tool 100, and step 310 includes gripping a lower tubular (the second tubular 30) with the lower clamp assembly 120 of the wrench tool 100. In one embodiment, the second tubular 30 may already be gripped by the lower clamp assembly 120 during initial joining using a primary rotating tool, therefore no additional gripping by the lower clamp assembly 120 may be necessary.

Step 315 includes rotating the upper tubular (first tubular 20) relative to the lower tubular (second tubular 30) for a predetermined time period. The predetermined time period may be 0.1 seconds to 0.5 seconds, or less than 0.1 seconds. The predetermined time period may be 0.5 seconds to 1 second, or less than 0.5 seconds. The predetermined time period may be 0.1 seconds to 1 second, or less than 0.1 seconds. The predetermined time period depends on several factors such as the response time of the torque detection circuit 180 and/or the control system 151, the computing power of the control system 151, etc.

Step 320 includes measuring a pressure differential between the first chamber 174 and the second chamber 186 of the torqueing cylinder 112A. Step 325 includes determining a rate of change of torque of the wrench tool 100 based on the pressure differential determined at step 320. Step 330 includes comparing the rate of change of torque with a predetermined rate of change of torque. The predetermined rate of change of torque may be based on historical data, theoretical torque data, or combinations thereof. Step 340 includes determining whether the rate of change of torque is greater than, or less than, the predetermined rate of change of torque as described above with respect to FIGS. 2A and 2B.

At step 345, normal torqueing operation of the threaded connection 10 is continued with the wrench tool 100 if the rate of change of torque is less than the predetermined rate of change of torque. Step 345 includes tightening the threaded connection 10 to a target torque value under the normal torqueing operation. At step 350 the fluid supply 150 to the torqueing cylinder 112A of the upper clamp assembly 115 is shut off, such as by closing one or both valves 170, 172, when the target torque value is reached, thus completing the threaded connection 10.

At step 355, an adjusted torqueing operation of the threaded connection 10 is initiated with the wrench tool 100 if the rate of change of torque is greater than the predetermined rate of change of torque. The adjusted torqueing operation includes rotating the upper clamp assembly 115 relative to the lower clamp assembly 120 at a rate slower than in a normal torqueing operation. The adjusted torqueing operation may include reducing the rate of fluid flow from the fluid supply 150 to the torqueing cylinder 112A, such as by adjusting (e.g. at least partially closing) one or both of the valves 170, 172 to reduce the rate of fluid flow through one or both of the valves 170, 172. Step 355 includes tightening the threaded connection 10 to a target torque value under the adjusted torqueing operation. At step 360 the fluid supply 150 to the torqueing cylinder 112A of the upper clamp assembly 115 is shut off when the target torque value is reached, thus completing the threaded connection 10.

While the foregoing is directed to embodiments of the disclosure, other and further embodiments of the disclosure thus may be devised without departing from the basic scope thereof, and the scope thereof is determined by the claims that follow.

The invention claimed is:

1. A method for applying torque to a threaded connection, the method comprising:
    gripping a first tubular with an upper clamp assembly;
    gripping a second tubular with a lower clamp assembly, the second tubular being at least partially coupled to the first tubular by a threaded connection;
    rotating the first tubular relative to the second tubular to determine a rate of change of torque on the threaded connection for a predetermined time, wherein the predetermined time is one second, or less;
    determining whether the rate of change of torque is greater than or less than a predetermined rate of change of torque; and
    rotating the first tubular relative to the second tubular until a target torque is reached.

2. The method of claim 1, wherein the upper clamp assembly is coupled to a torque detection circuit that is coupled to one or more torqueing cylinders adapted to perform the rotating.

3. The method of claim 2, wherein the torque detection circuit comprises one or more sensing devices coupled to the one or more torqueing cylinders.

4. The method of claim 3, wherein the rate of change of torque is determined by the sensing devices.

5. The method of claim 4, wherein the rate of change of torque comprises a pressure differential between chambers of the one or more torqueing cylinders.

6. A method for applying torque to a threaded connection, the method comprising:
gripping a first tubular with an upper clamp assembly;
gripping a second tubular that is coupled to the first tubular at a threaded connection with a lower clamp assembly;
sensing a rate of change of torque on the threaded connection by rotating the first tubular relative to the second tubular for a predetermined time;
determining whether a sensed rate of change of torque after the rotating is greater than or less than a predetermined rate of change of torque; and
rotating the first tubular relative to the second tubular based on the sensed rate of change of torque until a target torque on the threaded connection is reached, wherein the upper clamp assembly is coupled to a torque detection circuit that is coupled to one or more torqueing cylinders adapted to perform the rotating, and the torque detection circuit comprises one or more sensing devices to perform the sensing, and wherein a reduced rate of fluid is applied to the torqueing cylinders if the sensed rate of change of torque is greater than the predetermined rate of change of torque.

7. The method of claim 6, wherein the rate of change of torque comprises a pressure differential between chambers of the one or more torqueing cylinders.

8. The method of claim 6, wherein the predetermined time is one second or less.

9. A method for applying torque to a threaded connection, the method comprising:
gripping a first tubular with an upper clamp assembly;
gripping a second tubular with a lower clamp assembly, the second tubular being at least partially coupled to the first tubular by a threaded connection;
rotating the first tubular relative to the second tubular to determine a rate of change of torque on the threaded connection for a predetermined time;
determining whether the rate of change of torque is greater than or less than a predetermined rate of change of torque; and
rotating the first tubular relative to the second tubular until a target torque is reached, wherein the upper clamp assembly is coupled to a torque detection circuit that is coupled to one or more torqueing cylinders adapted to perform the rotating, wherein the torque detection circuit comprises one or more sensing devices coupled to the one or more torqueing cylinders, wherein the rate of change of torque is determined by the sensing devices, and wherein the rate of change of torque comprises a pressure differential between chambers of the one or more torqueing cylinders.

10. The method of claim 9, wherein the predetermined time is one second, or less.

11. A method for applying torque to a threaded connection, the method comprising:
gripping a first tubular with an upper clamp assembly;
gripping a second tubular that is coupled to the first tubular at a threaded connection with a lower clamp assembly;
sensing a rate of change of torque on the threaded connection by rotating the first tubular relative to the second tubular for a predetermined time, wherein the rate of change of torque comprises a pressure differential between chambers of the one or more torqueing cylinders;
determining whether a sensed rate of change of torque after the rotating is greater than or less than a predetermined rate of change of torque; and
rotating the first tubular relative to the second tubular based on the sensed rate of change of torque until a target torque on the threaded connection is reached.

12. The method of claim 11, wherein the upper clamp assembly is coupled to a torque detection circuit that is coupled to one or more torqueing cylinders adapted to perform the rotating, and the torque detection circuit comprises one or more sensing devices to perform the sensing.

13. The method of claim 12, wherein a reduced rate of fluid is applied to the torqueing cylinders if the sensed rate of change of torque is greater than the predetermined rate of change of torque.

14. The method of claim 11, wherein the predetermined time is one second or less.

15. A method for applying torque to a threaded connection, the method comprising:
gripping a first tubular with an upper clamp assembly;
gripping a second tubular that is coupled to the first tubular at a threaded connection with a lower clamp assembly;
sensing a rate of change of torque on the threaded connection by rotating the first tubular relative to the second tubular for a predetermined time, wherein the predetermined time is one second or less;
determining whether a sensed rate of change of torque after the rotating is greater than or less than a predetermined rate of change of torque; and
rotating the first tubular relative to the second tubular based on the sensed rate of change of torque until a target torque on the threaded connection is reached.

16. The method of claim 15, wherein the upper clamp assembly is coupled to a torque detection circuit that is coupled to one or more torqueing cylinders adapted to perform the rotating, and the torque detection circuit comprises one or more sensing devices to perform the sensing.

17. The method of claim 16, wherein a reduced rate of fluid is applied to the torqueing cylinders if the sensed rate of change of torque is greater than the predetermined rate of change of torque.

18. The method of claim 15, wherein the rate of change of torque comprises a pressure differential between chambers of the one or more torqueing cylinders.

* * * * *